United States Patent [19]

Cook, Jr.

[11] 3,842,952

[45] Oct. 22, 1974

[54] TRANSMISSION BANDS

[76] Inventor: William R. Cook, Jr., 3006 Ridge Rd. N.E., Cortland, Ohio 44410

[22] Filed: Dec. 1, 1972

[21] Appl. No.: 311,350

[52] U.S. Cl............... 188/249, 188/259, 192/107 T
[51] Int. Cl............................................ F16d 65/04
[58] Field of Search.... 188/249, 259, 250 H, 250 F; 192/107 T

[56] References Cited
UNITED STATES PATENTS

| | | | |
|---|---|---|---|
| 1,519,400 | 12/1924 | Gerald | 188/249 |
| 1,643,946 | 10/1927 | Frield | 188/249 |
| 1,698,475 | 1/1929 | Frield | 188/249 |
| 1,700,537 | 1/1929 | Key | 188/259 |
| 3,732,954 | 5/1973 | Heid | 188/259 |

Primary Examiner—George E. A. Halvosa
Attorney, Agent, or Firm—Michael Williams

[57] ABSTRACT

A novel transmission band for an automatic transmission and a novel method of installing the same. Automatic transmissions in modern automobiles include a transmission case in which mechanism is so highly compacted as to make replacement of bands a time-consuming, complicated operation, since the transmission must be removed from the drive train and largely disassembled in order to replace bands.

My invention provides a replacement band that may be installed around its drum while the transmission remains connected as part of the drive train. The improved band has an anchoring clip at one end which is attached to the band after the latter is disposed around its drum and therefore the band may be installed by snaking it lengthwise through the limited space between the drum periphery and an adjoining inner surface of the transmission case.

3 Claims, 8 Drawing Figures

PATENTED OCT 22 1974

TRANSMISSION BANDS

BACKGROUND AND SUMMARY

Automatic transmissions for automobiles have been in use for many years and are widely accepted. Present day transmissions are largely trouble free, except that the transmission bands, which are subject to hard usage, frequently wear or fracture and must be replaced. Prior to my invention, this required that the entire transmission had to be removed from drive train and largely disassembled in order to get to the transmission bands, and reverse assembly procedure had to be followed to install replacement bands and replace the transmission in the drive train.

My invention is particularly suited for use in Cruise-O-Matic transmissions used in Ford Motor Company automobiles, although it may be used in transmission of other manufacturers.

In automatic transmissions, bands encircle respective drums in the transmission case, such drums having anchor clips at opposite ends. The clips are engaged by band adjusting and operating mechanism, the latter at selected times tightening the band on its drum to effect predetermined transmission operation.

In most transmissions, and in the Cruise-O-Matic transmission in particular, space between the outer periphery of the drum and the adjoining inner surface of the case is just large enough to accommodate the thickness of the band, but will not pass the anchor clips. Provision is made for installing the band over its drum by axial movement, but this necessitated removal of the transmission from the drive train, and substantial disassembly of the transmission in order to provide for axial assembly of the band.

Reference is made to the Shop Manual for Cruise-O-Matic transmissions, wherein instructions are given to replace worn or fractured bands. This manual specifies that the transmission must be removed from the car and this itself is a dirty and time consuming job, since to remove the transmission the bell housing at the front of the transmission case must be unbolted from the engine and the extension housing at the rear of the case must be removed from connection with the drive shaft housing.

The removed transmission is then lifted to a bench, where the converter and front pump assembly are removed. In this operation, the further assembly containing the front and rear drum is disturbed and in many cases must be removed in order to insure that gaskets and other parts have not been damaged. Only then is the front clutch drum and band accessible, for axial removal of the damaged band installation of the replacement band. The operations are then reversed to reassemble the transmission components and to install the transmission back in the drive train of the automobile. This also requires new gaskets at various connections.

The foregoing is provided to illustrate the great amount of time required to install new bands in an automatic transmission, using present methods. Applicant, an expert on Cruise-O-Matic transmissions, estimates that a skilled mechanic is required to spend in excess of 8 hours in order to replace a band on the front clutch drum, and it is this band that requires most replacement. Through use of the invention disclosed herein, the replacement time is reduced to about 1 hour, and thus not only represents a saving in shop time but also eliminates need and cost of replacing gaskets and other parts disturbed by the disassembly operations.

DESCRIPTION OF THE DRAWINGS

In the drawings accompanying this description and forming a part of this application, there is shown, for purposes of illustration, an embodiment which my invention may assume, and in these drawings.

DESCRIPTION OF PREFERRED EMBODIMENT

Figure 2:
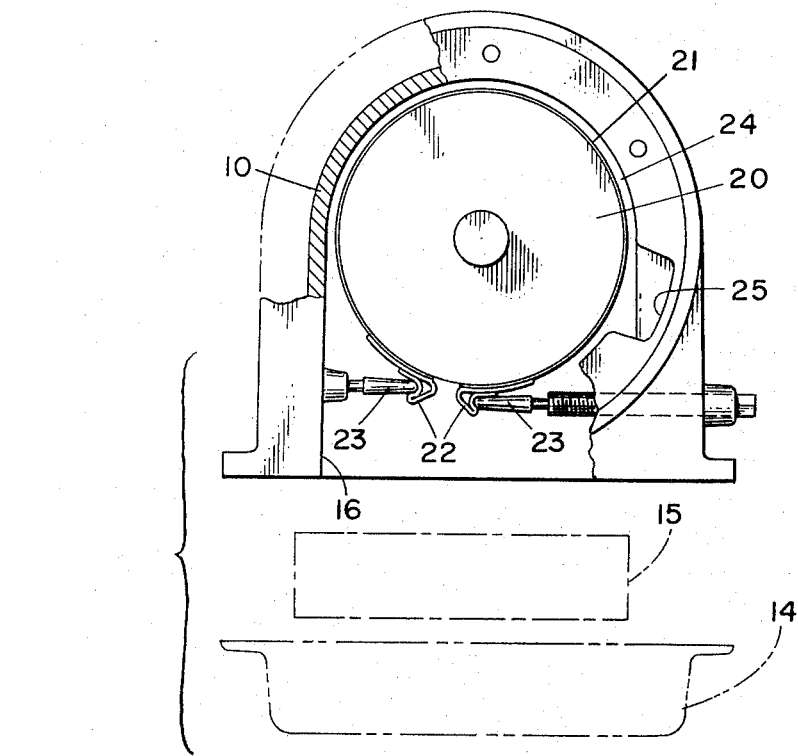
FIG. 2 is a section corresponding to the line 2—2 of FIG. 1, with parts broken away to show interior construction.
Figure 1:
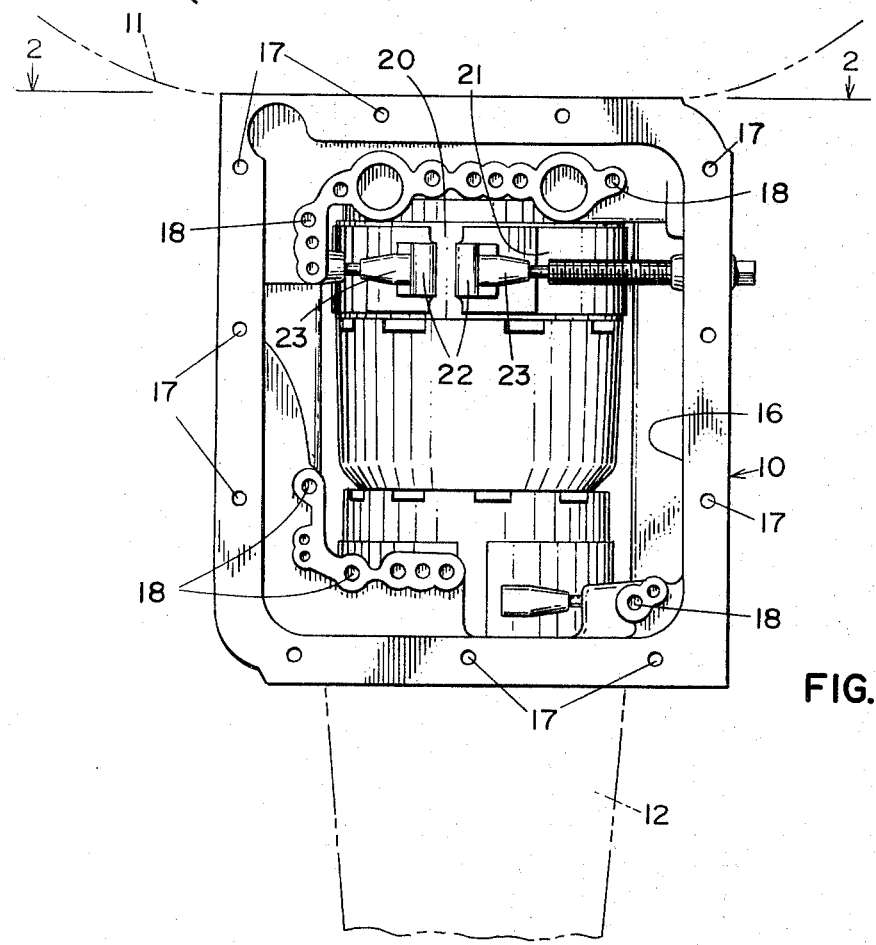
FIG. 1 is a bottom plan view of a transmission case, with oil pan and valve body removed, and with the bell housing and extension housing shown in phantom lines.
Figure 3:
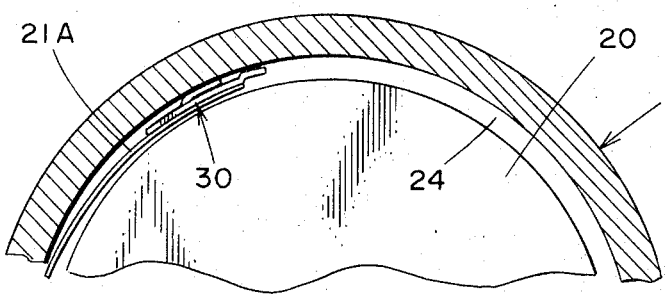
FIG. 3 is a fragmentary, enlarged view of a portion of FIG. 2 illustrating a step in the assembly.

With particular reference to FIGS. 1 and 2, a transmission case 10 is illustrated which, in this disclosure, represents a case of a Ford automatic transmission. The case has a bell housing 11 at the forward end and an extension housing 12 at the rear end of the case. It is to be understood that through use of my invention the automatic transmission does not have to be removed from the drive train. All that needs to be removed are the oil pan 14 and the valve body 15. The oil pan closes the bottom access opening 16 in the case and is held to the case by bolts (not shown) which are threaded into a series of holes 17 in a bottom flange of the case. After the oil pan 14 has been removed, the valve body 15 is freely accessible, and it may be removed by unscrewing bolts (not shown) which are threaded into a series of holes 18 formed in the valve body interior.

With the oil pan and valve body removed, the bottom access opening 16 is unobstructed, and the transmission parts appear as shown in FIG. 1, when looking upward from underneath the transmission. As seen, the lower end of the front clutch drum 20 and its band 21 are accessible. The band encircles the drum and has anchor clips 22 fixedly secured, as by welding, to opposite ends of the band. The anchor clips are cooperable with respective struts 23, one of which is threaded into the case for purposes of adjustng band clearance around the drum, and the other is hydraulically actuated to tighten the band on the drum, at selected times.

As seen in FIG. 2, a circular space 24 is provided between the outer periphery of the band 21 and the adjoining inner surface of the case 10. This space provides sufficient accommodation for the thickness of the band, but is insufficient to pass the anchor clips. Therefore in use of prior methods, the transmission had to be disassembled, as described, and the band installed by movement axially of the drum. FIG. 2 shows a recess 25 provided for clearance of the anchor clips in the prior method of installation, the band subsequently being rotated about the drum to dispose the anchor clips in their position shown in FIG. 2.

In use of my invention, one or both anchor clips are attached to the band 21a (FIGS. 3 through 8) after the latter has been disposed about the drum 20. Preferably, one anchor clip 22 is securely fixed to one end of the band (such as by welding as hereinbefore described) and the other anchor clip 22a is attached after the band has been assembled with the drum.

As before described, with the oil pan 14 and valve body 15 removed, access to the band 21 is provided. If this band is worn and should be replaced, the mechanic is required to back off the adjustable strut 23 to release the same from the anchor clips, and then cut the band inside of an anchor clip 22. The band sections may then be withdrawn from opposite sides of the drum by pulling the respective sections through the case access opening 16. If the band is fractured, no cutting is necessary, and the sections may be withdrawn as described.

In the preferred embodiment of my invention, the anchor clip 22a is formed in two parts, namely, an anchor portion 30 is fixedly secured to the end of band 21a, such as by welding, and a clip portion 31. The anchor portion is formed of a flat strip of metal of about the same gauge as that of the anchor clips hereinbefore used and is curved to correspond to the curvature of the drum.

Figure 7:
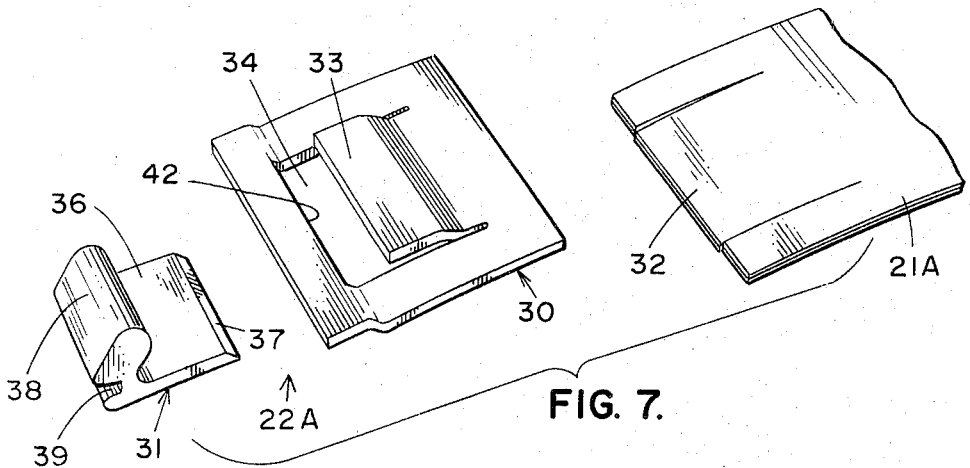
FIG. 7 is a perspective view of parts comprising the improved anchoring clips, with a band fragmentarily shown.
Figure 8:
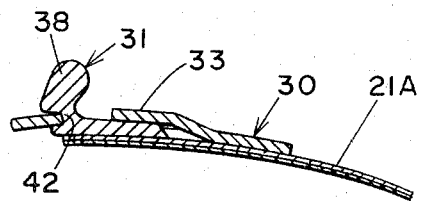
FIG. 8 is a longitudinal sectional view corresponding to the line 7—7 of FIG. 5, but with the anchoring clip assembled with the band.

With reference to FIG. 7, it will be noted that the end of the band 21a is lanced to provide a spring tongue 32. The anchor portion 30 is also lanced, to provide a rigid tongue 33, and an opening 34 between the free end of the tongue and an outwardly disposed end of the anchor portion 30. The anchor portion is welded to overlie the end of the band, at places designated 35 (see FIG. 5) so that the rigid tongue 33 overlies the spring tongue 32, the weld locations being such as not to interfere with springing of the tongue 32.

The anchor clip 31 may be formed of steel and has a body portion 36 which is of a width to fit within the opening 34 and has a beveled edge 37 at one end and a head 38 at the opposite end, the outer part of the head having a slot 39. To assemble the clip with the anchor, the body portion 36 is inserted into the opening 34 and under the rigid tongue 33 of the anchor portion 30, the beveled edge 37 assisting in this operation. The clip is then forced under the rigid tongue 33, the spring tongue 32 yielding to permit this. Wen the body portion 36 has been fully inserted under the rigid tongue, the edge 42 defining the opening 34 will snap into the slot 39, and the clip is thus firmly held in place for all practical use.

Figure 4:
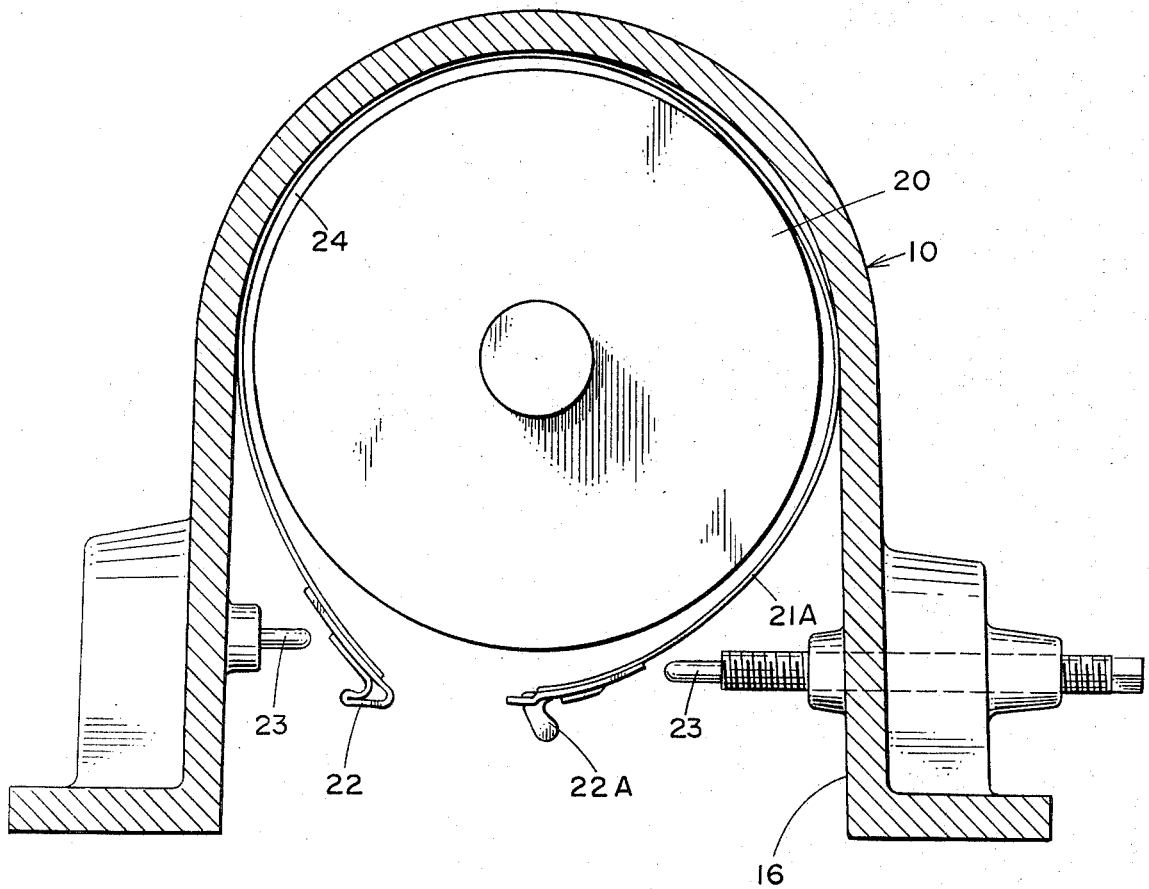
FIG. 4 is an enlarged view, similar to FIG. 2, with parts in section, and showing the band around the drum.
Figure 5:
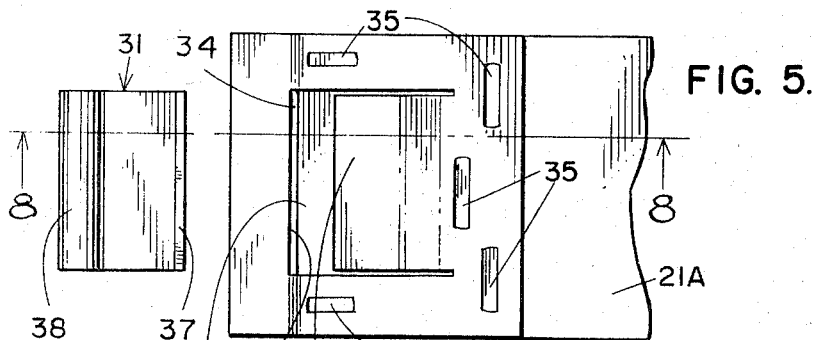
FIG. 5 is an enlarged, fragmentary, separated plan view of an end of the band, and an anchoring clip ready for attachment thereto.
Figure 6:
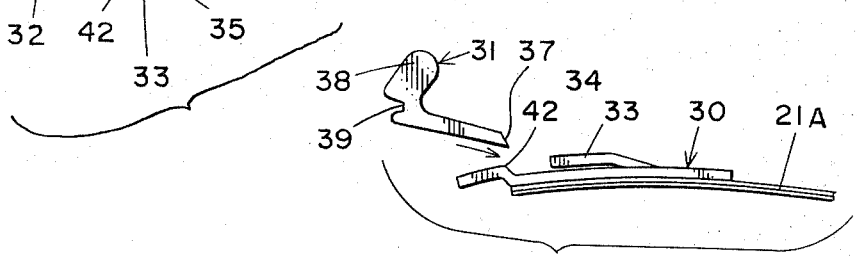
FIG. 6 is a side view of the parts shown in FIG. 5, with the anchoring clip ready for assembly.

To install a replacement band, the base 10 is in the condition shown in FIG. 4 with oil pan 14 and valve body 15 removed, and it is assumed that the worn or fractured band has been removed. The end of the band 21a, without the clip portion 31 attached, is snaked through the space 24, and it will be noted that the anchor portion 30 which is attached to the band end has a low profile to permit this installation of the band end. When this band end appears at the other side of the access opening 16, the clip portion 31 is snapped into place on the anchor portion and the parts are in the position shown in FIG. 4. Thereafter all that remains is to properly connect the struts 23 to the anchor clips, and bolt the valve body 15 and oil pan 14 in place, and add oil to the case 10.

I claim:

1. A band construction for an automatic transmission, comprising:
   a circular steel band provided with a brake lining on its inner surface, said band being of the slit type to provide two adjoining free ends,
   an anchor portion, comprising a body conforming to the curvature of said steel band and overlying the outer surface of the latter at one of said free ends, and fixed thereto,
   said body having a front portion extending crosswise of and projecting beyond the said one free end, said front portion being radially and outwardly off-set with respect to the remainder of said body,
   said body having an opening therethrough, formed by lancing and then displacing radially outwardly a central part of said body to form a rigid tongue and to define a rear edge of said front portion, said tongue and said front portion being outwardly off-set substantially the same amount from said body, the free lip of said tongue being spaced from and parallel to said rear edge of said front portion,
   a clip attachable to said anchor portion, including a body slightly less in width than the opening in said anchor portion body, and having a head at its forward end, said head having a cross-slot,
   the body of said clip being projectable into the opening in said anchor portion body to be disposed between said tongue and the outer adjacent surface of said steel band,
   the marginal portion defining the rear edge of said front portion being seated within said cross-slot in said head.

2. The construction according to claim 1 wherein the body of said clip is projected at an angle through the space between said tongue free lip and said rear edge of said front portion to enter the opening in said anchor portion body, and after said clip body is disposed between said tongue and the outer surface of said steel band said clip body is forced from angular disposition to a position wherein the rear edge of said front portion snaps into the cross-slot in said head.

3. The construction according to claim 2 wherein said one free end of said steel band has a pair of longitudinal lancings to provide a spring tongue therebetween, said spring tongue being displaced radially inwardly during assembly of said clip with said anchor portion.

* * * * *